(12) United States Patent
Hall et al.

(10) Patent No.: US 9,068,530 B2
(45) Date of Patent: Jun. 30, 2015

(54) CONNECTING ROD WITH LUBRICATION PASSAGE

(71) Applicant: Mahle International GmbH, Suttgart (DE)

(72) Inventors: Christopher Hall, Brighton, MI (US); Dan H. Dinu, Windsor (CA)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 13/838,445

(22) Filed: Mar. 15, 2013

(65) Prior Publication Data

US 2014/0261256 A1  Sep. 18, 2014

(51) Int. Cl.
*F02F 3/22* (2006.01)
*F16J 1/14* (2006.01)

(52) U.S. Cl.
CPC ..... *F02F 3/22* (2013.01); *F16J 1/14* (2013.01)

(58) Field of Classification Search
CPC .................. F16C 9/04; F16J 1/14; F16J 1/16
USPC .................. 123/41.37, 41.38, 197.3; 184/24; 74/587
See application file for complete search history.

(56) References Cited

U.S. PATENT DOCUMENTS

| | | | |
|---|---|---|---|
| 1,947,023 A * | 2/1934 | Shoemaker | 184/6.5 |
| 2,252,153 A * | 8/1941 | Anthony | 123/78 E |
| 2,418,901 A * | 4/1947 | Read | 184/6.5 |
| 3,131,785 A * | 5/1964 | Blank | 184/6 |
| 3,739,657 A | 6/1973 | Patchen et al. | |
| 3,842,938 A | 10/1974 | Barnes-Moss | |
| 4,398,507 A | 8/1983 | Belsanti | |
| 4,784,093 A | 11/1988 | Pfeffer et al. | |
| 4,956,366 A | 9/1990 | Nimmesgern et al. | |
| 4,979,427 A | 12/1990 | Pfeffer et al. | |
| 5,685,267 A | 11/1997 | Wiczynski et al. | |
| 5,724,863 A * | 3/1998 | Kramer et al. | 74/583 |
| 5,819,794 A | 10/1998 | Anderson | |
| 6,322,468 B1 | 11/2001 | Wing et al. | |
| 6,745,742 B2 | 6/2004 | Meyer | |
| 6,945,889 B2 | 9/2005 | Markley et al. | |
| 7,249,577 B1 | 7/2007 | Zhang et al. | |

* cited by examiner

*Primary Examiner* — Hung Q Nguyen
(74) *Attorney, Agent, or Firm* — Fishman Stewart Yamaguchi PLLC (57) ABSTRACT

Exemplary connecting rods and piston assemblies are disclosed. An exemplary connecting rod includes a shaft extending between a piston pin end and a crankshaft pin end, where the piston pin end defines a pin bore opening. The shaft defines a lubrication passage. The connecting rod further includes a piston pin bore surface extending about an inner circumference of the pin bore opening, and the lubrication passage extends through the shaft from the crankshaft pin end to the pin bore opening. The connecting rod may further include a valve received within the opening, e.g., a one-way valve, that is configured to permit a fluid to flow through the valve toward the piston pin end while restricting flow of the fluid through the valve toward the crankshaft pin end.

18 Claims, 7 Drawing Sheets

CONNECTING ROD WITH LUBRICATION PASSAGE

BACKGROUND

The traditional internal combustion engine relies on connecting rods for transmitting combustion power from a piston main body to a crankshaft of the engine, thereby converting the linear motion of the piston main body to rotational motion at the crankshaft. Combustion power is generated from the intermittent ignition of gasoline that is injected into the combustion chamber, which creates extreme pressures that are applied to the piston and connecting rod. In particular, the interface between the piston pin bore of the connecting rod and the piston pin experiences continuous radial loads during operation, where only a limited amount of a lubricant may be available for lubricating the interface. In an effort to enhance lubrication at the interface of the piston pin and the connecting rod bore, lubrication jets may be directed from the engine crankcase toward the piston pin interface.

Typically, lubrication jets are directed toward the piston to cool it. Known lubrication jets are typically mounted on the crankshaft pin or the crankshaft end of the connecting rod, and therefore can only provide lubrication at certain times during the combustion cycle such as when the connecting rod is positioned such that the jet is aimed toward the piston pin. Additionally, lubrication pressure may be inconsistent, especially upon during cold start conditions when oil pressure may be at a minimum. As a result, lubrication of the piston pin and connecting rod interface, as well as cooling provided to the interface between the piston pin and the connecting rod, may be undesirably intermittent and incomplete.

Accordingly, there is a need for a connecting rod providing improved lubrication to the piston pin interface.

BRIEF DESCRIPTION OF THE DRAWINGS

While the claims are not limited to the illustrated embodiments, an appreciation of various aspects is best gained through a discussion of various examples thereof. Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description. Exemplary embodiments of the present invention are described in detail by referring to the drawings as follows.

DETAILED DESCRIPTION

Reference in the specification to "an exemplary illustration", an "example" or similar language means that a particular feature, structure, or characteristic described in connection with the exemplary approach is included in at least one illustration. The appearances of the phrase "in an illustration" or similar type language in various places in the specification are not necessarily all referring to the same illustration or example.

Exemplary connecting rods and piston assemblies including a connecting rod and a piston pin are disclosed. An exemplary connecting rod includes a shaft extending between a piston pin end and a crankshaft pin end, where the piston pin end defines a pin bore opening. The shaft defines a lubrication passage. The connecting rod further includes a piston pin bore surface extending about an inner circumference of the pin bore opening, and the lubrication passage extends through the shaft from the crankshaft pin end to the pin bore opening. The connecting rod may further include a valve received within the opening that is configured to permit a fluid to flow through the valve toward the piston pin end while restricting flow of the fluid through the valve toward the crankshaft pin end. As such, the valve may be configured to maintain an amount of coolant in the passage after an initial operation.

Figure 1A:
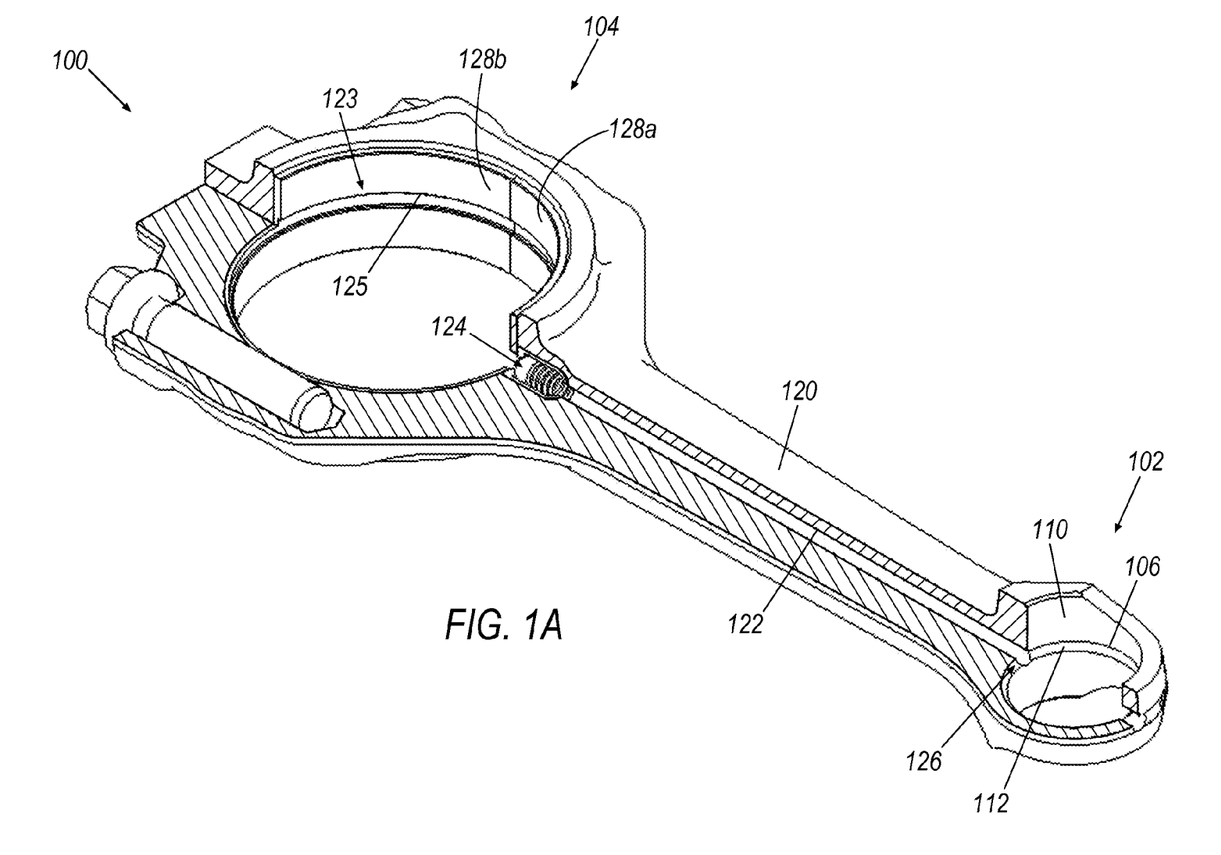
FIG. 1A is an elevated perspective partial cutaway view of an exemplary connecting rod.
Figure 1B:
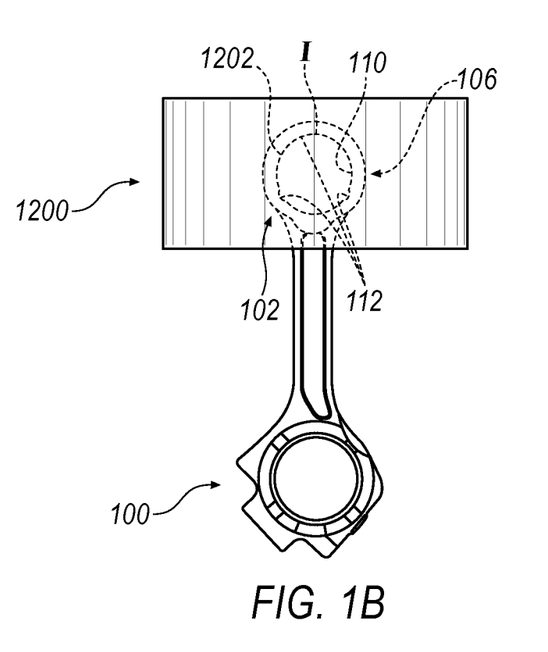
FIG. 1B is a side view of the connecting rod shown in FIG. 1A assembled with a piston and a piston pin.
Figure 2:
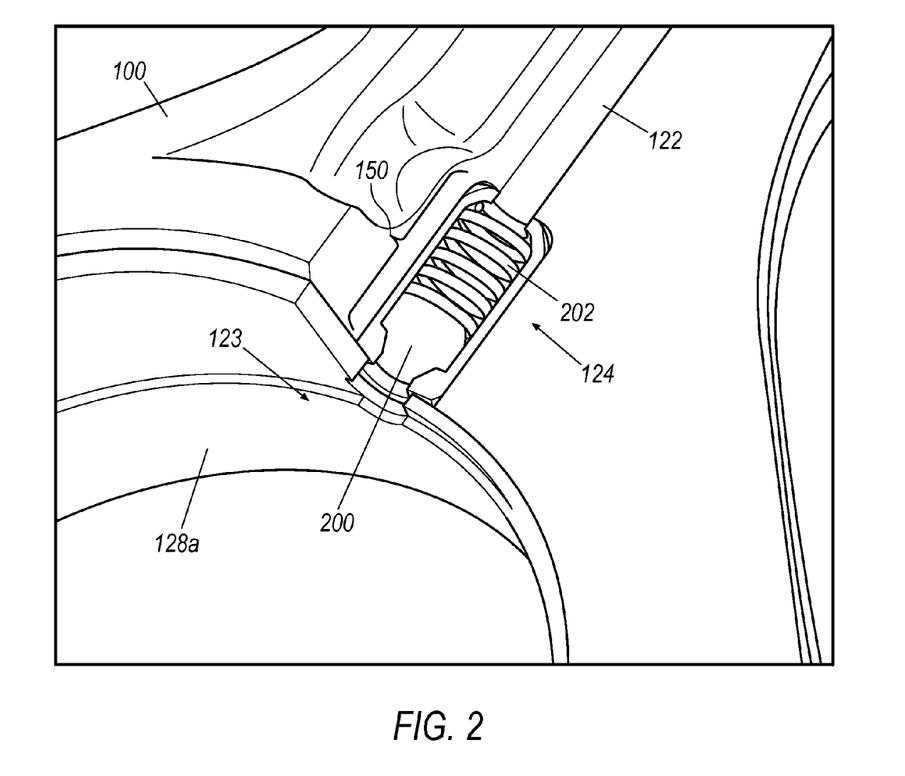
FIG. 2 is an enlarged elevational perspective view of a crankshaft bore end of the connecting rod.
Figure 3:
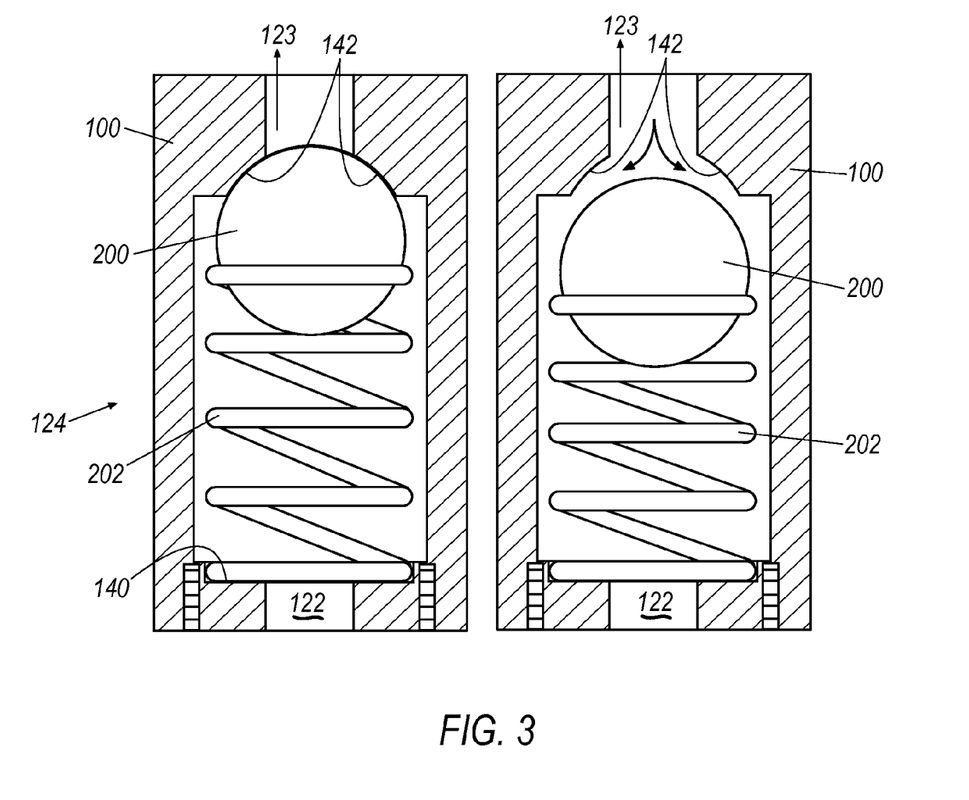
FIG. 3 is an enlarged view of an exemplary valve for a connecting rod passage.

Turning now to FIGS. 1-3, an exemplary connecting rod 100 for a piston assembly is illustrated. The connecting rod 100 includes a piston pin or small end 102 and a crankshaft or large end 104. The piston pin end 102 includes a piston pin bore 106 that defines a piston pin bore surface 110. The piston pin bore surface 110 includes at least one pin end passage 112 located at the piston pin bore surface 110. The pin end passage 112 may extend about an entire circumference of the piston pin bore surface 110 to provide lubrication to a piston pin interface, as will be described further below.

Referring more specifically to FIG. 1A, the connecting rod 100 includes a shaft 120 extending longitudinally between the piston pin end 102 and the crankshaft end 104. The shaft 120 may include a generally I-shaped cross-section typical of connecting rods, or alternatively may have any generally quadrangular section, such as, for example, a square or generally rectangular cross section, merely as examples. The crankshaft or large end 104 generally defines a crankshaft pin bore 123.

The pin end passage 112 may generally facilitate lubrication of the piston pin end generally, and more particularly an interface between a piston pin (not shown in FIG. 1A) and the piston pin bore surface 110 of the connecting rod 100. More particularly, the pin end passage 112 may be used to circulate a lubricant, such as, for example, oil or other coolant, during operation when the connecting rod 100 is assembled in a piston assembly. For example, as shown in FIG. 1B, the connecting rod 100 is shown assembled with a piston. More specifically, the connecting rod 100 may be assembled to a piston main body 200 by way of a piston pin 1202. In other words, a piston pin 1202 may be received in the piston pin end 102 of the connecting rod 100, i.e., within piston pin bore 106, thereby generally securing the connecting rod 100 to the piston 1200. In one example the piston 1200 may be assembled within a cylinder of an internal combustion engine. A desired lubricant based interface I between the piston pin bore surface 110 of the connecting rod 100 and the piston pin 1202 typically experiences continuous radial loads from the piston pin 1202 during operation. The piston end passage 112 may be provided in an effort to enhance lubrication between the piston pin 1202 and the piston pin bore surface 110.

More specifically, a passage 122 extending through the shaft 120 may generally accumulate lubricant, maintaining lubrication along the interface I. In one exemplary illustration, a passage 122 may have a valve 124 disposed in an end of the passage 122 adjacent crankshaft bore opening 123. The valve 124 may be generally received within the passage and configured to permit a fluid, e.g., oil, coolant or lubricant, to flow through the valve 124 toward the piston pin bore 106. Moreover, the valve 124 may generally restrict flow of the fluid or lubricant through the valve 124 toward the crankshaft bore 123. Thus, valve 124 may be a one-way valve or check valve, permitting lubricant to pass through passage 122 from crankshaft end 104 toward piston end 102 when a threshold pressure is reached that overcomes the spring force of a compliant member 202 discussed in detail below with respect to FIG. 2, but not in the opposite direction back toward crankshaft end 104. Thus, the valve 124 may thereby be configured to maintain a pressure or a predetermined amount of fluid or coolant in the passage 122. Moreover, as the pin end passage 112 generally extends about the entire circumference of the pin bore surface 110 as outlined above, lubrication may generally be provided about the entire circumference of the interface I between the piston pin (not shown in FIG. 1A) and the connecting rod 100 via the passage 122.

More specifically, upon startup of an engine using connecting rod 100, oil pressure may generally build within the crank case (not shown), which is in turn supplied to the crankshaft bore 123. Merely as an example, a crankshaft may itself have passages or apertures designed to provide lubrication or coolant to a groove 125 defined in the crankshaft bore 123. When oil pressure reaches a sufficient magnitude, the pressure may generally urge the valve 124 so that it overcomes any pre-existing biasing toward a closed position to permit fluid flow into the passage 122. Oil may then flow through the passage 122 and into the pin end passage 112 by way of opening 126. Accordingly, so long as a sufficient pressure is maintained by the engine, oil or other lubricant may continue to flow into the passage 122 through the valve 124, providing lubricant to the interface I.

Moreover, the valve 124 may also generally accumulate or maintain an amount of oil or a pressure of oil within the passage 122. More specifically, when engine operation ceases and/or oil pressure drops, the valve 124 may generally close, thereby restricting or preventing entirely oil in the passage 122 from reversing flow into the crankshaft bore 123. Accordingly, oil may generally remain in the passage 122. Upon subsequent startup of the engine, the oil in the passage 122 is positioned to provide lubrication about the piston pin interface I (see FIG. 1B). The passage 122 and valve 124 may thereby facilitate enhanced lubrication, especially during startup conditions prior to a buildup of oil pressure in the crank case.

As best seen in FIG. 1A, the passage 122 generally extends from the crankshaft bore 123 all the way to piston pin bore 106. Accordingly, a generally steady supply of oil or lubricant is generally constantly supplied to the interface I (see FIG. 1B) during engine operation. By contrast, in previous approaches passages defined at the crankshaft end of a connecting rod would only supply lubrication during particular times of the engine stroke when the passages were exactly aligned to direct lubrication toward the piston. Moreover, even these approaches only generally provide lubrication in the vicinity of the piston pin since they merely direct oil toward the underside of the piston. Accordingly, coverage of the interface I between the piston pin and connecting rod was relatively incomplete.

The valve 124 may take any form or configuration that is convenient. As seen in FIG. 1A, valve 124 may be installed in an enlarged end or pocket 150 of the passage 122. Referring now to FIGS. 2 and 3, the valve 124 may generally be secured within the pocket 150 adjacent to passage 122. Crankshaft and bushings 128a, 128b may generally trap the valve 124 within the pocket 150. Accordingly, the valve 124 may generally be secured adjacent to passage 122 in between the crankshaft bore 123 and the passage 122.

As best seen in FIGS. 2 and 3, according to one exemplary illustration the valve 124 generally includes a spherical member 200 and a biasing or compliant member 202. Upon buildup of a sufficient pressure in the crankshaft bore 123, the spherical member 200 may be urged away from the crankshaft bore 123, against a spring force of the compliant member 202. Accordingly, the valve 124 may be opened to generally permit the flow of the coolant or lubricant through the valve 124 and into the passage 122. When oil pressure drops below a predetermined amount, determined in part by the spring force of the compliant member 202, the spherical member 200 may be generally urged by the compliant member 202 against shoulder portions 142 of the valve 124. The spherical member 200 made thus generally obstruct the passage 122. By contrast, when pressure again builds up within the crankshaft bore 123, pressure may generally urge the spherical member 200 away from the shoulders 142, thereby allowing fluid to flow past spherical member 200 and into the passage 122.

Figure 4A:
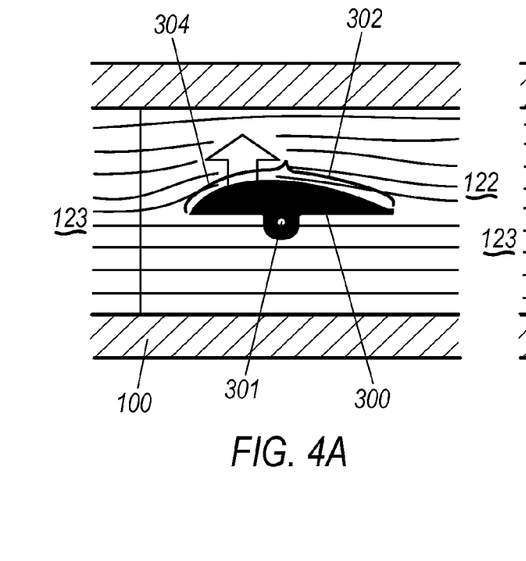
FIG. 4A is an enlarged view of another exemplary valve for a connecting rod passage, showing the valve in an open configuration.
Figure 4B:
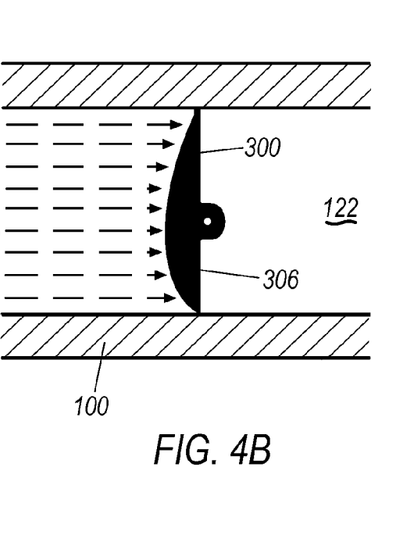
FIG. 4B is an enlarged view the valve of FIG. 4A for a connecting rod passage, showing the valve closed and about to open due to a pressure being applied.
Figure 4C:
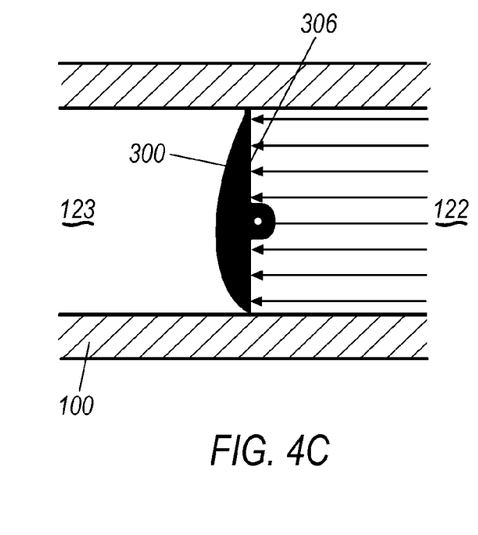
FIG. 4C is an enlarged view the valve of FIGS. 4A and 4B for a connecting rod passage, showing the valve closed.

Turning now to FIGS. 4A, 4B and 4C, another exemplary valve for use in a passage 122 is illustrated. The valve 300 may include a tilting disc, as shown. More specifically, a disc 300 may generally pivot about an axis 301 to selectively close off passage 122 from crankshaft bore 123. More specifically, in FIG. 4B the valve 300 is shown in an initially closed state. The valve 300 has a generally curved surface defined in part by a first curve 304 and a second curve 302. The different curves 302, 304 are designed such that when the valve is closed, e.g., as shown in FIG. 4B, a pressure differential between the two curves 304, 302 may cause the valve to rotate into an open configuration, e.g., as seen in FIG. 4A. Furthermore, in the absence of sufficient pressure, a compliant element or spring member (not shown in FIGS. 4A, 4B and 4C) may be provided to generally urge the disk 300 into the closed state, as shown in FIG. 4B. By contrast, when pressure drops within the crankshaft bore 123, or when fluid attempts to flow from the passage 1222 crankshaft bore 123, as shown in FIG. 4C, the disc 300 may generally remain closed. More specifically a backside 306 of the disk 300 may generally be flat, and thus there is not a sufficient pressure differential with respect to the axis 301, and the valve 300 remains closed.

Figures 5A, 5B:
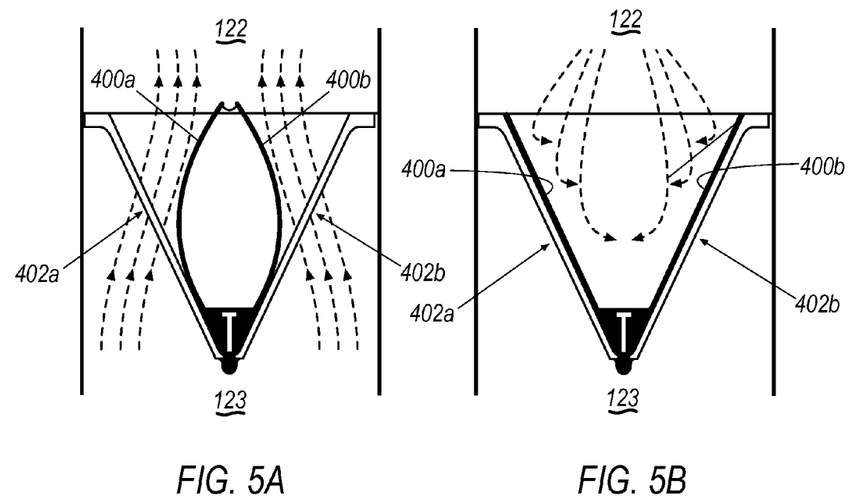
FIG. 5A is an enlarged view of another exemplary valve for a connecting rod passage, showing the valve in an open configuration.
FIG. 5B is an enlarged view the valve of FIG. 5A for a connecting rod passage, showing the valve closed.

Turning now to FIGS. 5A and 5B, another valve 400 is illustrated. Valve 400 may generally include a first valve element 400a and a second valve element 400b, which selectively close off corresponding valve bores 402a and 402b. More specifically, the valve element 400a, 400b may generally be laid over the corresponding bores 402a, 402b when the valve is in a closed configuration, e.g., as seen in FIG. 5B. Accordingly, a lack of pressure or insufficient pressure to overcome the valve elements 400a, 400b will allow the valve elements 400a, 400b to remain generally closed. Moreover, pressure from passage 122 to the crankshaft bore 123 will tend to urge the valve elements 400a and 400b to remain closed against the corresponding bores 402a and 402b. Moreover, when pressure from the crankshaft bore 123 is observed at the bores 402a, 402b, the valve elements 400a, 400b may generally be urged away from the corresponding bores 402a, 402b. Accordingly, oil or another lubricant may be allowed to flow through the valve 400 from the crankshaft bore 123 to passage 122.

Figure 6:
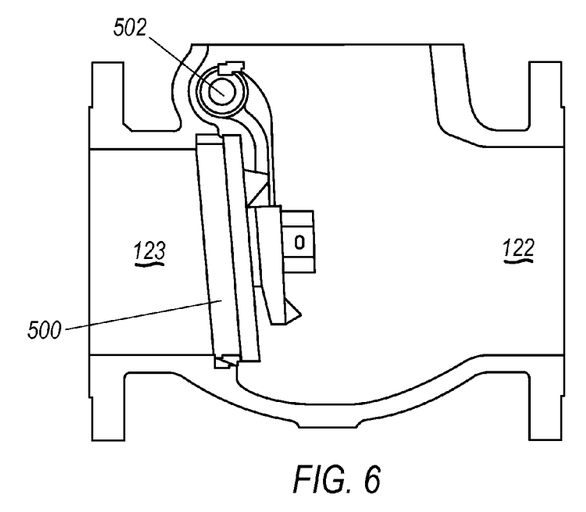
FIG. 6 is an enlarged view of another exemplary valve for a connecting rod passage, showing the valve in a closed configuration.

Turning now to FIG. 6, another valve 500 is illustrated. Valve 500 may generally include a pivoting door 500 that rotates about an axis 502. The axis 502 and/or the attachment of the door 500 may generally include a compliant member (not shown), which urges the door 500 into the closed position shown in FIG. 6. Accordingly, in the absence of pressure or flow attempting to go from the passage 122 into the crankshaft bore 123, the door 500 remains closed. When pressure within the crankshaft bore 123 builds up sufficiently, the door 500 may generally pivot about the axis 502, thereby allowing fluid or lubricant to flow from the crankshaft bore 123 into the passage 122.

Figures 7A, 7B:
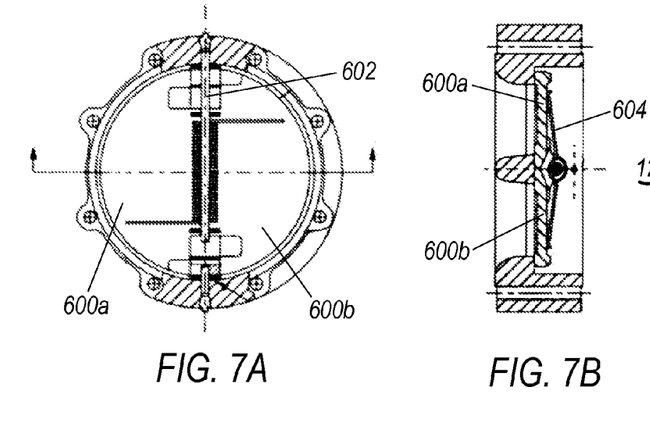
FIG. 7A is an end view of another exemplary valve for a connecting rod passage, showing the valve in a closed configuration.
FIG. 7B is a side view of the exemplary valve of FIG. 7A, showing the valve in a closed configuration.
Figure 7C:
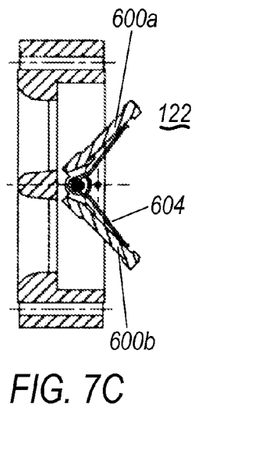
FIG. 7C is a side view of the exemplary valve of FIG. 7A, showing the valve in an open configuration.

Turning now to FIGS. 7A, 7B, and 7C, another exemplary valve 600 is illustrated. Valve 600 may generally include two valve doors 600a, 600b which are generally urged into a closed configuration as shown in FIG. 7B by a compliant element 604. Accordingly, in the absence of sufficient pressure in the crankshaft bore 123, the compliant member 604 generally urges the valve doors 600a and 600b into a closed configuration as shown in the FIG. 7B. When pressure in the crankshaft bore 123 builds to a predetermined magnitude, the doors 600a, 600b may generally swing open against the spring force of the compliant member 604, as best seen in FIG. 7C.

Figure 8A:
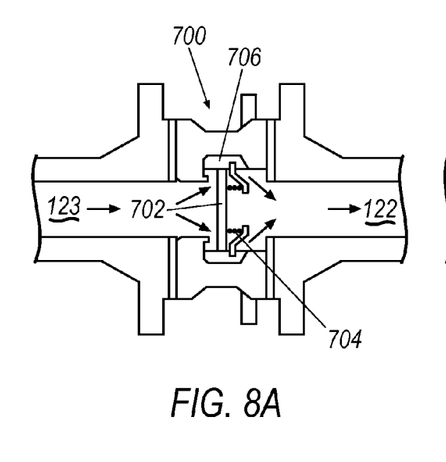
FIG. 8A is an enlarged view of another exemplary valve for a connecting rod passage, showing the valve in an open configuration.
Figure 8B:
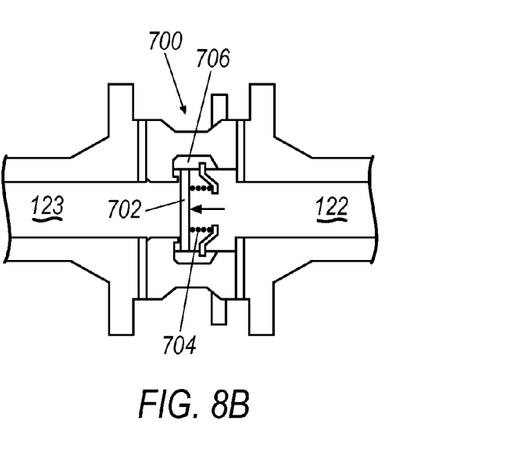
FIG. 8B is an enlarged view the valve of FIG. 8A for a connecting rod passage, showing the valve closed.

Turning now to FIGS. 8A and 8B, another exemplary valve 700 is illustrated. Valve 700 may include a door 702 and a compliant element 704. The compliant element 704 may, in the absence of sufficient pressure within the crankshaft bore 123, generally urge the door 702 into a closed position, as seen in FIG. 8B. When pressure builds within the crankshaft bore 123, the door, 702 is urged against the compliant member 704, thereby allowing oil to flow radially outwardly with respect to the door 702 into radial passage 706. The oil or other lubricant may flow from the radial passage 706 into the passage 122.

The piston pin bore surface 110 may be generally profiled or curved from one end of the piston pin bore 106 to the other, such that the piston pin bore surface 110 includes a substantially convex surface. A generally convex pin bore surface 110 may be advantageous, because the piston pin 1202 (illustrated in FIG. 1B) may experience some degree of bending during operation of the piston cylinder assembly 1200. A generally curved pin bore surface 100 may thus accommodate at least a portion of the bending of the piston pin 1202. The piston pin bore surface 110 may also include an anti-friction coating applied along at least a portion of the piston pin bore surface 110. The anti-friction coating may be any coating that improves wear or scuffing resistance of the piston pin bore surface 110, such as, but not limited to, a manganese-phosphate coating. Moreover, although the piston pin bore 106 is illustrated as a bushingless pin bore, it should be noted that a bushing may be included within the piston pin bore 106 as well, where the pin end passage 112 is formed along a surface of the bushing that contacts a piston pin, such as the piston pin 1202 illustrated in FIG. 1B.

The connecting rod 100 may be formed in any process and of any material that is convenient. For example, at least the piston pin end 102 of the connecting rod 100 may be constructed from a metal based material. Merely as examples, some metals that may be used include steel, aluminum, or titanium. The passage 122 may be formed as part of a process used to form the connecting rod 100 generally, e.g., in a casting process. Alternatively, the passage 122 may be machined or drilled after the connecting rod 100 is formed initially in a different process, e.g., forging or casting. Additionally, in another exemplary illustration the pin end passage 112 may be defined in a separate forming operation from the forming of the connecting rod 100 generally or the piston pin bore surface 110. That is, the forming of the pin end passage 112 and the forming of the piston pin bore 106 may be separate operations. More specifically, the connecting rod 100 and bore surfaces 110 may generally be forged, while the pin end passage 112 may be machined into the bore surface 110.

As noted above, exemplary connecting rods 100 may generally maintain a pressure or an amount of lubricant within passage 122, e.g., by way of the valve 124. Moreover, the lubricant may generally be accurately and consistently provided to an interface between a piston pin and the connecting rod as a result of the pin end passage 112 in communication with and extending about an entire periphery of the pin bore surface 110.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of

What is claimed is:

1. A connecting rod, comprising:
a shaft extending between a piston pin end and a crankshaft pin end, the piston pin end defining a pin bore opening, the shaft defining a lubrication passage;
a piston pin bore surface extending about an inner circumference of the pin bore opening, wherein the lubrication passage extends through the shaft from the crankshaft pin end to the pin bore opening; and
a valve received within the passage, the valve configured to permit a fluid to flow through the valve toward the piston pin end while restricting flow of the fluid through the valve toward the crankshaft pin end, such that the valve is configured to maintain an amount of coolant in the passage after an initial operation, wherein the valve is configured to move laterally with respect to the passage to restrict flow of the fluid through the valve toward the crankshaft pin end, wherein the valve includes a disc pivotally disposed within a passage inlet, the disc configured to pivot about an axis aligned transverse to the passage.

2. The connecting rod of claim 1, wherein the pin bore surface is formed integrally with the pin bore opening.

3. The connecting rod of claim 1, wherein the pin bore opening defines a passage aperture at an end of the passage.

4. The connecting rod of claim 3, wherein the piston pin bore surface of the connecting rod defines a pin end passage in communication with the passage aperture.

5. The connecting rod of claim 4, wherein the pin end passage extends around an entire circumference of the piston pin bore surface.

6. The connecting rod of claim 1, further comprising a crankshaft end bushing configured to trap the valve within an opening to the passage adjacent the crankshaft pin end.

7. The connecting rod of claim 1, wherein the passage extends from the crankshaft pin end to the piston pin bore surface.

8. The connecting rod of claim 1, wherein the disc defines a curved surface configured to maintain the disc in an open position in response to a predetermined flow through the passage.

9. The connecting rod of claim 8, wherein the curved surface includes first and second curves, the first and second curves being different such that a pressure differential causes the valve to pivot about an axis transverse to the passage.

10. A connecting rod, comprising:
a shaft extending between a piston pin end and a crankshaft pin end, the piston pin end defining a pin bore opening, the shaft defining a lubrication passage;
a piston pin bore surface extending about an inner circumference of the pin bore opening, wherein the lubrication passage extends through the shaft from the crankshaft pin end to the pin bore opening; and
a one-way valve received within the passage, wherein the valve is configured to move laterally with respect to the passage to restrict flow of the fluid through the valve toward the crankshaft pin end, wherein the valve includes a disc pivotally disposed within a passage inlet, the disc configured to pivot about an axis aligned transverse to the passage.

11. The connecting rod of claim 10, wherein the one-way valve is configured to permit a fluid to flow through the valve toward the piston pin end while restricting flow of the fluid through the valve toward the crankshaft pin end, such that the valve is configured to maintain an amount of coolant in the passage after an initial operation.

12. The connecting rod of claim 10, wherein the pin bore opening defines a passage aperture at an end of the passage.

13. The connecting rod of claim 12, wherein the piston pin bore surface of the connecting rod defines a pin end passage in communication with the passage aperture.

14. The connecting rod of claim 13, wherein the pin end passage extends around an entire circumference of the piston pin bore surface.

15. The connecting rod of claim 10, further comprising a crankshaft end bushing configured to trap the valve within an opening to the passage adjacent the crankshaft end.

16. The connecting rod of claim 10, wherein the passage extends from the crankshaft pin end to the piston pin bore surface.

17. A piston assembly, comprising:
a connecting rod, including:
a shaft extending between a piston pin end and a crankshaft pin end, the piston pin end defining a bore opening, the shaft defining a passage extending from the crankshaft pin end to the bore opening;
a piston pin bore surface formed integrally with the piston pin end and extending about an inner circumference of the bore opening; and
a valve received within the passage, the valve configured to permit a fluid to flow through the valve toward the piston pin end while restricting flow of the fluid through the valve toward the crankshaft pin end, such that the valve is configured to maintain an amount of coolant in the passage after an initial operation, wherein the valve is configured to move laterally with respect to the passage to restrict flow of the fluid through the valve toward the crankshaft pin end, wherein the valve includes a disc pivotally disposed within a passage inlet, the disc configured to pivot about an axis aligned transverse to the passage; and
a piston pin selectively extending through the bore opening of the connecting rod and the piston bore, the piston pin configured to secure the connecting rod to the piston.

18. A connecting rod comprising:
a shaft extending between a piston pin end and a crankshaft pin end, the piston pin end defining a pin bore opening, the shaft defining a lubrication passage;
a piston pin bore surface extending about an inner circumference of the pin bore opening, wherein the lubrication passage extends through the shaft from the crankshaft pin end to the pin bore opening; and
a valve received within the passage, the valve configured to permit a fluid to flow through the valve toward the piston pin end while restricting flow of the fluid through the valve toward the crankshaft pin end, such that the valve is configured to maintain an amount of coolant in the passage after an initial operation, wherein the valve is configured to move laterally with respect to the passage to restrict flow of the fluid through the valve toward the crankshaft pin end, wherein the valve comprises a pair of valve elements configured to be urged laterally away from corresponding valve bores to permit a fluid to flow through the valve toward the piston pin end.

* * * * *